Dec. 13, 1960            C. W. PINKLEY            2,964,696

NUCLEAR MAGNETIC RESONANCE MEASURING APPARATUS

Filed Jan. 2, 1958            2 Sheets-Sheet 1

INVENTOR
Clyde W. Pinkley
By Anthony D. Cennamo

Dec. 13, 1960 C. W. PINKLEY 2,964,696
NUCLEAR MAGNETIC RESONANCE MEASURING APPARATUS
Filed Jan. 2, 1958 2 Sheets-Sheet 2

INVENTOR
Clyde W. Pinkley

United States Patent Office 2,964,696
Patented Dec. 13, 1960

2,964,696

NUCLEAR MAGNETIC RESONANCE MEASURING APPARATUS

Clyde W. Pinkley, Columbus, Ohio, assignor to Industrial Nucleonics Corporation, a corporation of Ohio Filed Jan. 2, 1958, Ser. No. 706,740

10 Claims. (Cl. 324—.5)

This invention relates to measuring apparatus, and in particular to improved means for subjecting a material to be analyzed by nuclear magnetic resonance to the magnetic and radio-frequency fields which satisfy the requirements for nuclear resonance.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from a tank coil. When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different isotopes have different resonant frequencies.

The absorption phenomenon of nuclear magnetic resonance is also used to measure constituent proportions in various compounds. For example, moisture content measurements can be made in materials, such as tobacco or paper. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the radio-frequency field is perpendicular to the magnetic field, and the material to be measured is placed within the coil.

The radio-frequency field, or the magnetic field, is modulated at a slow audio rate. When the radio-frequency and the magnetic fields satisfy the relation $W_0 = \gamma H_0$, where "$W_0$" is the angular velocity of the radio-frequency field, "$H_0$" is the permanent magnetic field strength in gauss, and "$\gamma$" is a constant dependent on the type of nucleus subjected to resonance, nuclear magnetic resonance occurs. In moisture measurements, the hydrogen nucleus is caused to resonate, and "$\gamma$" equals $2.67 \times 10^4$ sec$^{-1}$ gauss$^{-1}$.

The resulting nuclear resonance causes a decrease in the impedance of the tank circuit, and therefore a decrease in the voltage appearing across the tank circuit. For a given set of conditions the magnitude of this change in voltage is proportional to the amount of moisture present so that a quantitative measurement can be made.

With a given amount of moisture, the magnitude of voltage change is proportional to the radio-frequency field strength provided that saturation does not occur. It is therefore desirable to maintain the field strength to as high a value as possible without attaining saturation.

The use of nuclear magnetic resonance for the measurement of moisture in sheet material presents the problem of subjecting a cross section of the sheet to the mutually perpendicular radio-frequency and magnetic fields which satisfy the requirements for nuclear resonance. Since it is physically impossible to place a large sheet of material within the radio-frequency coil where the radio-frequency field has its highest, most uniform concentration, the sheet must be subjected to the field extending from the end of the coil (where the field is dispersed) thus greatly decreasing the sensitivity of the measuring device.

Accordingly, a principal object of this invention is to improve the sensitivity of nuclear magnetic resonance apparatus employed to analyze the characteristics of sheet material.

Another object is to improve the accuracy and the signal-to-noise ratio of nuclear magnetic resonance apparatus adapted to make measurements on sheet material.

Another object is to provide an improved magnet and coil assembly for generating the magnetic and radio-frequency fields necessary to make nuclear magnetic resonance measurements.

Another object is to provide an improved coil arrangement for concentrating a radio-frequency field in a cross section of sheet material to be measured by nuclear magnetic resonance.

Another object is to provide an improved magnet and coil assembly for nuclear magnetic resonance apparatus requiring relatively inexpensive magnets.

A preferred embodiment of this invention comprises a pair of axially-aligned spaced coils each included in an independent radio-frequency resonant circuit tuned to the same frequency. A pair of axially-aligned spaced magnets are disposed relative to the coils on mutually perpendicular axes which intersect one another in the region between the coils and the magnets. A sheet of material whose characteristics are to be measured is disposed in a plane containing the intersection point of the axes and having a 45° angle relationship with both of these axes.

Accordingly, a common area of this sheet is subjected to mutually perpendicular magnetic and radio-frequency fields. While this area of the sheet is removed a relatively large distance from the adjacent ends of the radio-frequency coils, the field generated by these coils is nonetheless relatively intense and concentrated. These desired characteristics are attained because both coils are included in independent circuits tuned to the same frequency. Therefore, the one coil and its associated circuit serve to load the other coil thereby concentrating the radio-frequency field and preventing a dispersion of this field.

In order that all of the features for attaining the objects of this invention may be readily understood, reference is herein made to the drawings wherein.

A measuring instrument operative in response to nuclear magnetic resonance usually includes a magnet and coil assembly that subjects the material to be tested to mutually perpendicular radio-frequency and magnetic fields. An appropriate output voltage appearing across a coil is applied to circuit readout means for making quantitative determinations.

Figure 1:
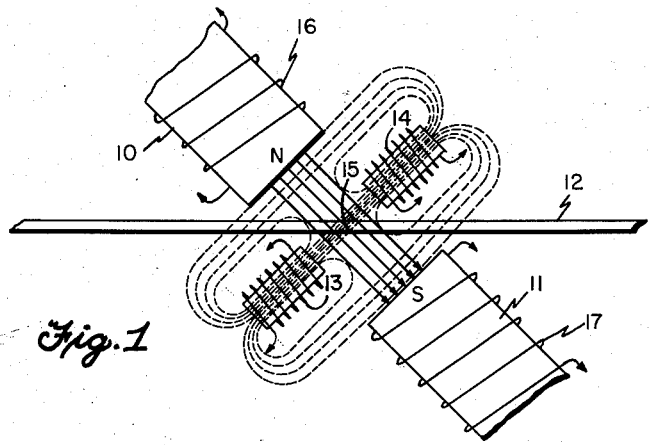
Fig. 1 is a simplified view showing the physical disposition of a pair of spaced magnets and a pair of spaced radio-frequency coils for measuring the characteristics of a sheet of material.

In the magnet and coil assembly shown in Fig. 1, axially-aligned magnets 10 and 11 are spaced one from the other so that sheet material 12 is positioned therebetween. Axially-aligned radio-frequency coils 13 and 14 are disposed relative to magnets 10 and 11 so that the radio-frequency field generated by these coils is perpendicular to the magnetic field. The magnets 10 and 11 and coils 13 and 14 are disposed on mutually perpendicular axes which intersect one another in a region between the coils and magnets. Sheet 12 passes through the point of intersection 15 at a 45° angle to both axes so that a common area of the sheet is subjected to magnetic and radio-frequency fields which satisfy the requirements for nuclear resonance.

Modulating coils 16 and 17 are wound around magnets 10 and 11, respectively, so that the magnetic field may be amplitude modulated at a relatively low rate. The modulated magnetic field thereby periodically subjects sheet 12 to the magnetic field intensity required for resonance measurements in accordance wtih the equation $W_0 = \gamma H_0$ previously set forth.

Figure 2:
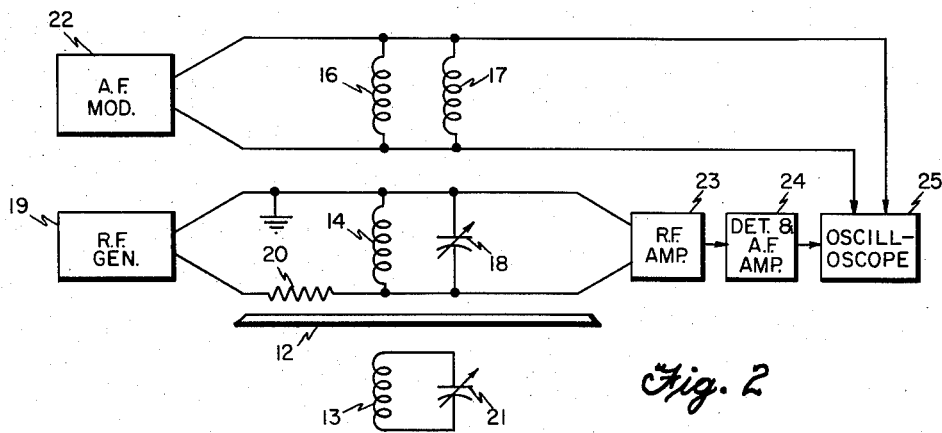
Fig. 2 is a block diagram of a first preferred circuit arrangement incorporating the magnet and coil assembly shown in Fig. 1.

Fig. 2 shows a circuit arrangement for making moisture content measurements on sheet 12 and incorporating the magnet and coil assembly of Fig. 1. In particular, radio-frequency coil 14 is shunted by capacitor 18 to form a parallel-resonant tank circuit. Radio-frequency generator 19 energizes the tank circuit 14—18 at the resonant frequency for this tank circuit. Radio-frequency generator 19 is preferably a constant current generator, so that the voltage generated across tank circuit 14—18 is responsive only to variations in the Q of the tank circuit cause by the energy absorption of the sheet 12 at nuclear resonance. This, of course, requires that the generator 19 have a high internal impedance compared to the parallel impedance of tank circuit 14—18. Resistor 20 interposed in the output connection of radio-frequency generator 19 is representative of this high internal impedance.

Capacitor 21 directly shunts radio-frequency coil 13 thereby forming a tank circuit which is coupled to the tank circuit 14—18. In view of the fact that tank circuit 13—21 is tuned to the same frequency as tank circuit 14—18, this latter tank circuit is loaded and a substantial circulating current is caused to flow in the loop defined by coil 13 and capacitor 21. Tank circuit 13—21 presents a constant load to tank circuit 14—18, and therefore the voltage developed across coil 14 shows no modulation component due to this loading effect.

Audio-frequency modulator 22 energizes modulating coils 16 and 17 associated with magnets 10 and 11, respectively, so that sheet 12 is subjected to a modulated magnetic field intensity. The nuclear magnetic resonance frequency for the moisture (hydrogen nucleus) in sheet 12 is thereby periodically attained for the particular output frequency of generator 19. The resulting periodic loading of coil 14 at nuclear resonance lowers the Q of tank circuit 14—18 so that the parallel impedance of this tank circuit is periodically modulated in accordance with the moisture content of the portion of sheet 12 under test.

The varying raido-frequency voltage developed across tank circuit 14—18 is applied to radio-frequency amplifier 23, and the output of this amplifier is applied to detector and audio-frequency amplifier unit 24. This latter unit develops an audio-frequency signal corresponding to the modulation component introduced by the varying moisture content in sheet 12. This signal is applied to the vertical amplifier of oscilloscope 25.

The horizontal sweep of oscilloscope 25 is synchronized to the input vertical voltage by applying a voltage from audio-frequency modulator 22 to appropriate horizontal sweep terminals for the oscilloscope. Accordingly, a stationary pulse appears on the screen of the oscilloscope which has an amplitude responsive to variations in the moisture content of sheet 12.

It should be noted that each of coils 13 and 14 is incorporated in a separate tank circuit. The loading of coil 14 by coil 13 increases the coupling therebetween, which in turn increases the radio-frequency field concentrated in the space between the coils over that attainable by prior art arrangements having only a single coil and associated tank circuit. The novel arrangement herein, therefore, subjects a larger area of the sample to mutually perpendicular fields than is possible using a single coil disposed on one side of the sheet.

The effects may be readily visualized with reference to Figure 1 by first considering the effect of coil 14 in the absence of coil 13. Assuming a current flow in coil 14, the resulting magnetic flux lines passing through the center of the coil will be parallel to the axis of the coil in the central region of the coil per se. These parallel flux lines are there perpendicular to the magnetic field of magnets 10 and 11. However, at a slight distance from the end of the coil, the paths of the flux lines begin to depart from the said perpendicular direction as the flux lines disperse to pass around the outside of the coil. At the distance of measuring point 15, only a relatively sparse concentration of flux lines is present, and moreover these lines tend to deviate from the necessary perpendicular direction.

When coil 13 is added and electrically energized with proper polarity, it can be seen that mutually generated magnetic flux lines will pass continuously through the centers of both coils. Thus by minimizing dispersion the lines generated by the coils are much more concentrated in the region of measuring point 15. Moreover, the number of flux lines perpendicular to the field provided by magnets 10 and 11 is greatly increased.

Coils 14 and 13 may quite properly be considered to constitute a radio-frequency transformer wherein coil 14 is the primary winding which drives a secondary winding 13, inducing a voltage therein which is either in phase or 180° out of phase with the voltage applied to the primary winding. When coil 13 is included in a resonant tank circuit tuned to the frequency of the voltage applied to coil 14, the resonant circuit stores electromagnetic energy received through interaction with the oscillating magnetic field of coil 14, resulting in substantial circulating currents in the secondary tank circuit.

Figure 3:
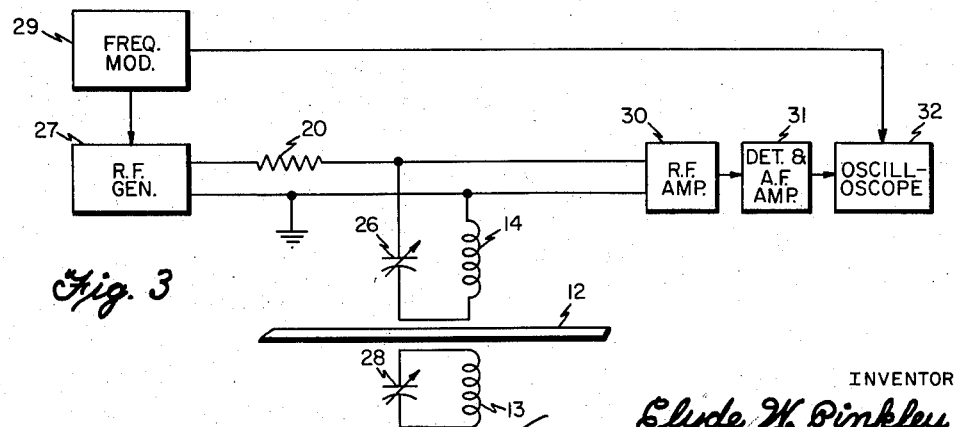
Fig. 3 is a block diagram of a second preferred circuit arrangement incorporating the magnet and coil assembly shown in Fig. 1.

Referring now to the second preferred circuit embodiment shown in Figure 3, the output of radio-frequency generator 27 is applied to coil 14 through a serially-connected capacitor 26. Coil 14 and capacitor 26 form a series resonant tank circuit tuned to the output frequency of generator 27. The series impedance of tank circuit 14—26 at resonance is substantially less than the parallel impedance of tank circuit 14—18 shown in Fig. 2. Accordingly, the amplitude of the carrier generated by tank circuit 14—26 is much less than the amplitude of the corresponding carrier generated in the circuit arrangement of Figure 2. However, the modulation components introduced in the voltage appearing across tank circuit 14—26 by variations in nuclear absorption in sheet 12 are of substantially the same order as the amplitude of the modulation components appearing across the tank circuit 14—18 of Figure 2 due to nuclear absorption.

Tank circuit 13—28 performs a function identical to that of tank circuit 13—21 shown in Figure 2.

In the arrangement of Figure 3, modulation coils 16 and 17 shown in Figure 1 are not actively employed. As an alternative, the output of radio-frequency generator 27 is frequency modulated by unit 29. Accordingly, a frequency modulated signal is applied to series tank circuit 14—26 which is periodically driven through the resonant frequency for the nucleus under test in sheet 12 (hydrogen nucleus).

The signal developed across tank circuit 14—26 is applied to the input of radio-frequency amplifier 30, and the output signal developed by radio-frequency amplifier 30 is applied to detector and audio-frequency amplifier unit 31. The output of unit 31 is in turn applied to the vertical amplifier of oscilloscope 32, and the horizontal sweep of oscilloscope 32 is synchronized to the frequency modulated output of unit 29. Accordingly, variations in the moisture content of sheet 12 produce a fixed pulse on the screen of oscilloscope 32 which has an amplitude that varies in accordance with the moisture content of the sheet under test.

Figure 4:
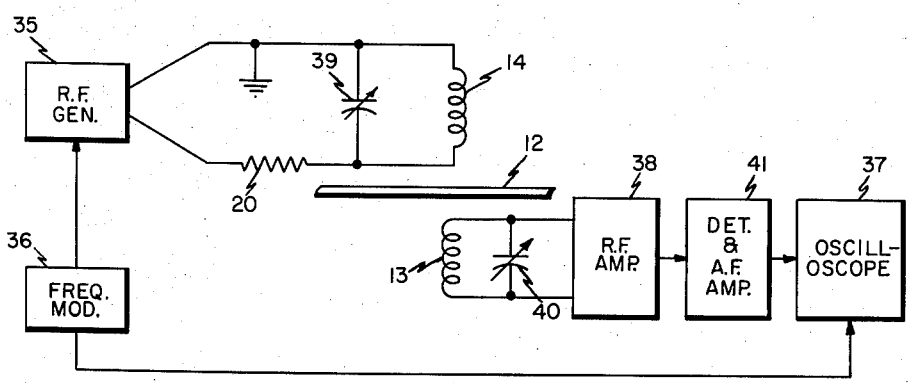
Fig. 4 is a block diagram of a third preferred circuit arrangement incorporating the magnet and coil assembly shown in Fig. 1.

Figure 4 discloses a circuit arrangement that corresponds generally with the circuit arrangement of Figure 3 in that the radio-frequency generator 35 is frequently modulated by source 36. Additionally, source 36 provides synchronization for the horizontal sweep voltage of oscilloscope 37. The primary difference between circuit arrangements is that radio-frequency amplifier 38 is energized from a voltage developed across tank coil 13 in lieu of tank coil 14.

Capacitor 40 shunts tank coil 13 to form a parallel resonant tank circuit connected to the input of radio-frequency amplifier 38. The output of this radio-frequency amplifier is applied to the input of the detector and audio-frequency amplifier unit 41. The output of unit 41 is applied to the vertical amplifier of oscilloscope 37. Accordingly, a stationary pulse appears on the screen of the oscilloscope having an amplitude that corresponds to the moisture content of sheet 12.

Figure 5:
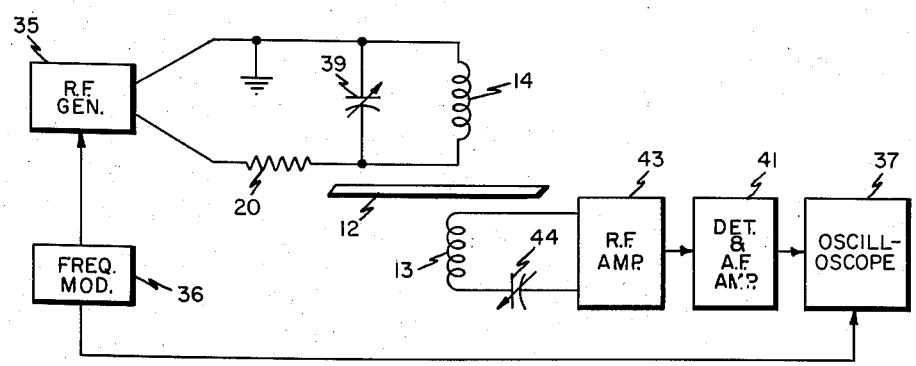
Fig. 5 is a block diagram of a fourth preferred circuit arrangement incorporating the magnet and coil assembly shown in Fig. 1.

The embodiment shown in Figure 5 corresponds generally with the circuit arrangement of Figure 4. The primary difference in circuitry relates to the use of a series tank circuit to apply input voltage to radio-frequency amplifier 43. This series tank circuit includes coil 13 and capacitor 44. The remaining components of the arrangement of Figure 5 correspond in function to the similar components employed in the configuration of Figure 4. It should be noted, however, that the tank circuit 13—44 has a very low series impedance at resonance, and therefore radio-frequency amplifier 43 should have a low input impedance. The circuit arrangement of Figure 5 is characterized by the highest moisture signal-to-circuit noise ratio of the four circuits shown. The action of the series tuned circuit is to decrease the carrier level without attenuating the signal generated by nuclear absorption. Accordingly, the noise level is greatly decreased. With this latter circuit arrangement, it is possible to read a given moisture content at a lower field strength because of a better signal-to-noise ratio and therefore magnet expense can be substantially reduced.

It should be understood that the above described arrangements are illustrative of the principles of this invention. Numerous other embodiments may be devised by those skilled in the art without departing from the scope of this invention.

What is claimed is:

1. Nuclear magnetic resonance apparatus for measuring the material properties of a sheet, comprising a pair of mutually electrically isolated spaced coils positioned on opposite sides of said sheet and each included in an independent radio-frequency resonant circuit tuned to the same frequency, a radio-frequency source energizing a first of said resonant circuits with the other resonant circuit serving to load said first resonant circuit through the radio-frequency magnetic field between said coils, means developing a magnetic field perpendicular to said radio-frequency field, and means driven by the radio-frequency voltage developed across one of said resonant circuits for providing a quantitative indication of the absorbing nuclei of the material composing said sheet.

2. In nuclear magnetic resonance apparatus for subjecting a material to mutually perpendicular magnetic and radio-frequency fields, the improvement comprising a pair of mutually electrically isolated radio-frequency resonant circuits tuned to the same frequency, a pair of coils spaced on opposite sides of said material, each of said coils being included in one of said circuits, a radio-frequency source energizing one of said resonant circuits whereby the other resonant circuit serves to load said one resonant circuit through the radio-frequency magnetic field between said coils, and means developing a magnetic field perpendicular to said radio-frequency field.

3. The combination of claim 2 including means for amplitude modulating said magnetic field whereby the nuclei of the material are caused to periodically resonate for the particular frequency of the radio-frequency field.

4. The combination of claim 2 including means for frequency modulating the output of said radio-frequency source whereby the nuclei of the material are caused to periodically resonate for the particular intensity of the magnetic field.

5. In nuclear magnetic resonance apparatus for subjecting a material to mutually perpendicular magnetic and radio-frequency fields, the improvement comprising a pair of mutually electrically isolated radio-frequency resonant circuits tuned to the same frequency, a pair of coils spaced on opposite sides of said material, each of said coils being included in one of said circuits, a radio-frequency source energizing one of said resonant circuits whereby the other resonant circuit serves to load said one resonant circuit through the radio-frequency field between said coils, means developing a magnetic field perpendicular to said radio-frequency field, and readout means connected across said one resonant circuit and responsive to the voltage variations developed in response to nuclear absorption of the material.

6. The combination of claim 5 wherein said one resonant circuit is a parallel resonant circuit and the other resonant circuit includes a capacitor shunting the coil thereof.

7. The combination of claim 5 wherein said one resonant circuit is a series resonant circuit and the other resonant circuit includes a capacitor shunting the coil thereof.

8. In nuclear magnetic resonance apparatus for subjecting a material to mutually perpendicular magnetic and radio-frequency fields, the improvement comprising a pair of mutually electrically isolated radio-frequency resonant circuits tuned to the same frequency, a pair of coils spaced on opposite sides of said material, each of said coils being included in one of said circuits, a radio-frequency source energizing one of said resonant circuits whereby the other resonant circuit serves to load said one resonant circuit through the radio-frequency field between said coils, means developing a magnetic field perpendicular to said radio-frequency field, and readout means connected across said other resonant circuit and responsive to the voltage variations developed in response to nuclear absorption of the material.

9. The combination of claim 8 wherein said other resonant circuit is a parallel resonant circuit and the one resonant circuit includes a capacitor shunting the coil thereof.

10. The combination of claim 8 wherein said other resonant circuit is a series resonant circuit and the one resonant circuit includes a capacitor shunting the coil thereof.

References Cited in the file of this patent

UNITED STATES PATENTS

| 2,217,843 | Langer | Oct. 15, 1940 |
| 2,331,418 | Nolde | Oct. 12, 1943 |
| 2,799,823 | Shaw et al. | July 16, 1957 |

FOREIGN PATENTS

| 163,872 | Australia | July 5, 1955 |
| 1,141,373 | France | Mar. 18, 1957 |

OTHER REFERENCES

Pake: American Journal of Physics, vol. 18, No. 8, November 1950, pp. 473, 474 relied on.

Weaver. Physical Review, vol. 89, No. 5, March 1, 1953, pp. 923–926 relied on.

Bloom et al.; Physical Review, vol. 97, No. 6, Mar. 15, 1955, pp. 1699–1709.